United States Patent
Sheen

(10) Patent No.: US 7,268,712 B1
(45) Date of Patent: Sep. 11, 2007

(54) SYSTEM AND METHOD FOR CALIBRATING ON-DIE COMPONENTS

(75) Inventor: Ruey-Bin Sheen, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 11/406,947

(22) Filed: Apr. 18, 2006

(51) Int. Cl.
*H03M 1/10* (2006.01)

(52) U.S. Cl. .......................... 341/120; 326/30

(58) Field of Classification Search ................ 341/117, 341/118, 119, 120; 326/30
See application file for complete search history.

(56) References Cited

U.S. PATENT DOCUMENTS

2005/0242832 A1* 11/2005 Shin ........................... 326/30

OTHER PUBLICATIONS

Cox, Dennis T., et al., "VLSI Performance Compensation For Off-Chip Drivers And Clock Generation", IEEE 1989 Custom Integrated Circuits Conference, CH2671-6/89/0000-0079, pp. 14.3.1-14.3.4.

Fan, Yongping et al., "On-Die Termination Resistors With Analog Impedance Control For Standard CMOS Technology", IEEE Journal of Solid-State Circuits, vol. 38, No. 2, (Feb. 2003), pp. 361-364.

Gabara, Thaddeus, et al., "Ground Bounce Control In CMOS Integrated Circuits", Digest of Technical Papers, IEEE Int'l Solid State Circuits Conference, ISCC 88 (Feb. 1988), pp. 88-90.

Lim, Chee How et al., "Output Buffer With Self-Adjusting Slew Rate And On-Chip Compensation", Paper from Portland Technology Development, Intel Coporation and Dept. of Electrical Engineering, Portland State Universary, pp. 1-5, Feb. 2-3, 1998.

Song, Ho Young, et al., "A 1.2Gb/S/pin Double Data Rate SDRAM With On-Die-Termination", IEEE Int'l Solid-State Circuits Conference, ISSCC (Feb. 2003), Paper 17.8, pp. 1-10.

Yoo, C., et al., "A 1.8V 700 Mb/s/pin 512 Mb DDR-II SDRAM With On-Die Termination And Off-Chip Driver Calibration", IEEE Int'l Solid State Circuits Conference, ISSCC (Feb. 2003), Paper 17.7, pp. 1-15.

* cited by examiner

*Primary Examiner*—Jean Bruner Jeanglaude
(74) *Attorney, Agent, or Firm*—Kirkpatrick & Lockhart Preston Gates Ellis LLP

(57) ABSTRACT

An on-die calibration system includes an external reference component, a first and a second on-die adjustable components, and a calibration module coupled to the reference component, the first and second components, wherein the calibration module calibrates the first component according to the reference component and calibrates the second component according to the calibrated first component.

17 Claims, 3 Drawing Sheets

SYSTEM AND METHOD FOR CALIBRATING ON-DIE COMPONENTS

BACKGROUND

The present invention relates generally to integrated circuit designs, and, more particularly, to on-die calibration circuit designs.

Electrical signals are reflected back when they reach the end of a transmission path, or at points where impedance differs. Signal reflection causes noise, which lowers signal quality. In a high-speed data transfer system, high quality signals are required and even a slight amount of noise can be a major problem. On-die-termination (ODT) reduces signal reflection by attaching a resistor with a suitable resistance value, to an I/O pin of a chip. The termination resistance 'swallows' the signaling voltage, which, therefore cannot be reflected.

When termination resistors are built on a die, the resistance of the resistors may fluctuate due to PVT (process, voltage, temperature) variations. Then an on-die PVT compensation circuit becomes desirable in a chip design. An on-die PVT compensation circuit automatically calibrates all the ODT resistors through internal calibration loops.

What is needed is an improved method and system for calibrating on-die components.

SUMMARY

This invention discloses a method and system for on-die component calibration. The system, according to one embodiment of the present invention, may comprise an external reference component, a first and a second on-die adjustable component, and a calibration module coupled to the reference component, the first and second components, wherein the calibration module calibrates the first component according to the reference component and calibrates the second component according to the calibrated first component.

DESCRIPTION

Figure 1:
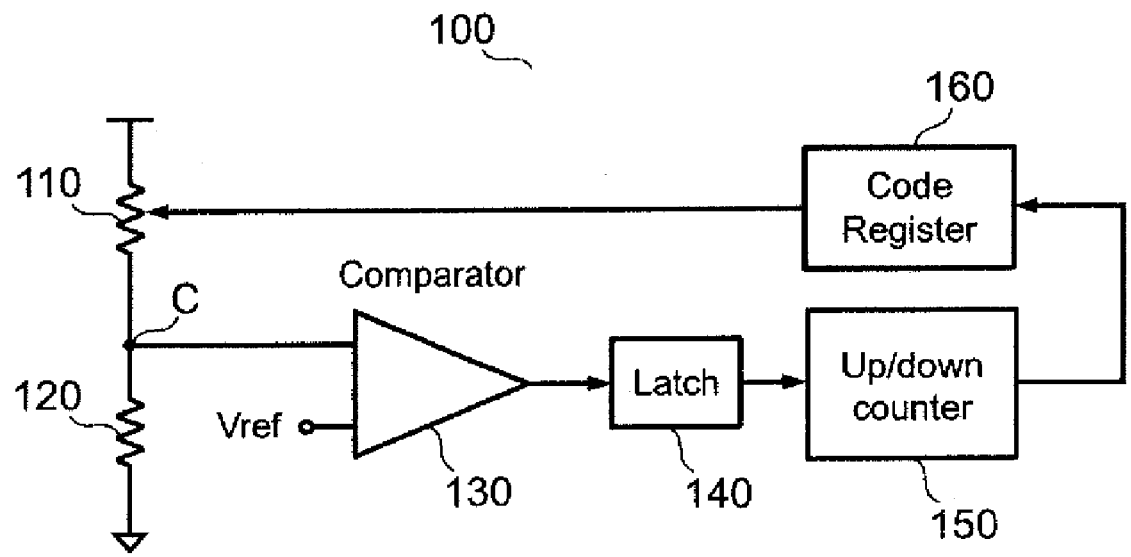
FIG. 1 is a block diagram of a conventional resistor calibration system illustrating a mechanism of calibrating a digital-code-controlled resistor.

FIG. 1 is a block diagram of a conventional resistor calibration system 100 illustrating a mechanism of calibrating a digital-code-controlled (DCC) resistor 110. Resistor 120 is a reference resistor, serially connected with the DCC resistor 110. Then the resistors are connected between a system of high voltage (Vcc) and a system of low voltage (Vss). A connection node C between the two resistors 110 and 120 serves as one of two inputs of a comparator 130. The other input of the comparator 130 is connected to a reference voltage (Vref). An output of the comparator 130 is coupled to a latch 140 input. Then latched data from the comparator 130 is fed into an up/down counter 150. In one design, the counter 150 counts up when node C voltage is higher than Vref, and counts down when Vref is higher than node C voltage. Yet in another design, the counter 150 can work the opposite way, i.e., counts up when Vref is higher than node C voltage, and counts down when node C voltage is higher than Vref. Either way, when the difference between node C voltage and Vref falls into a predetermined range, the counter 150 stops counting and outputs a counting result number to a code register 160. The counting result number is then used to determine a resistor value of the DCC resistor 110.

Figure 2:
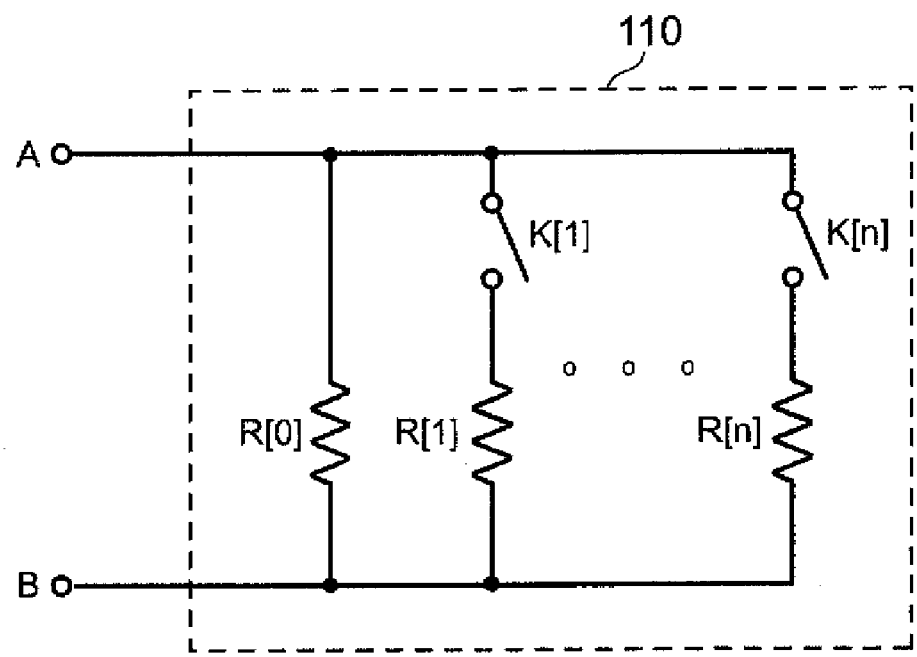
FIG. 2 is a schematic diagram of a digital-code-controlled (DCC) resistor.

FIG. 2 is a schematic diagram of the DCC resistor 110 as shown in FIG. 1. Referring to FIG. 2, resistors R[1:n] are connected in parallel with a resistor R[0] through their respective switches K[1:n]. The switches K[1:n] are controlled by the code register 160 as shown in FIG. 1. The more switches are closed, e.g., more resistors are connected, the lower the total resistance between nodes A and B.

Figure 3:
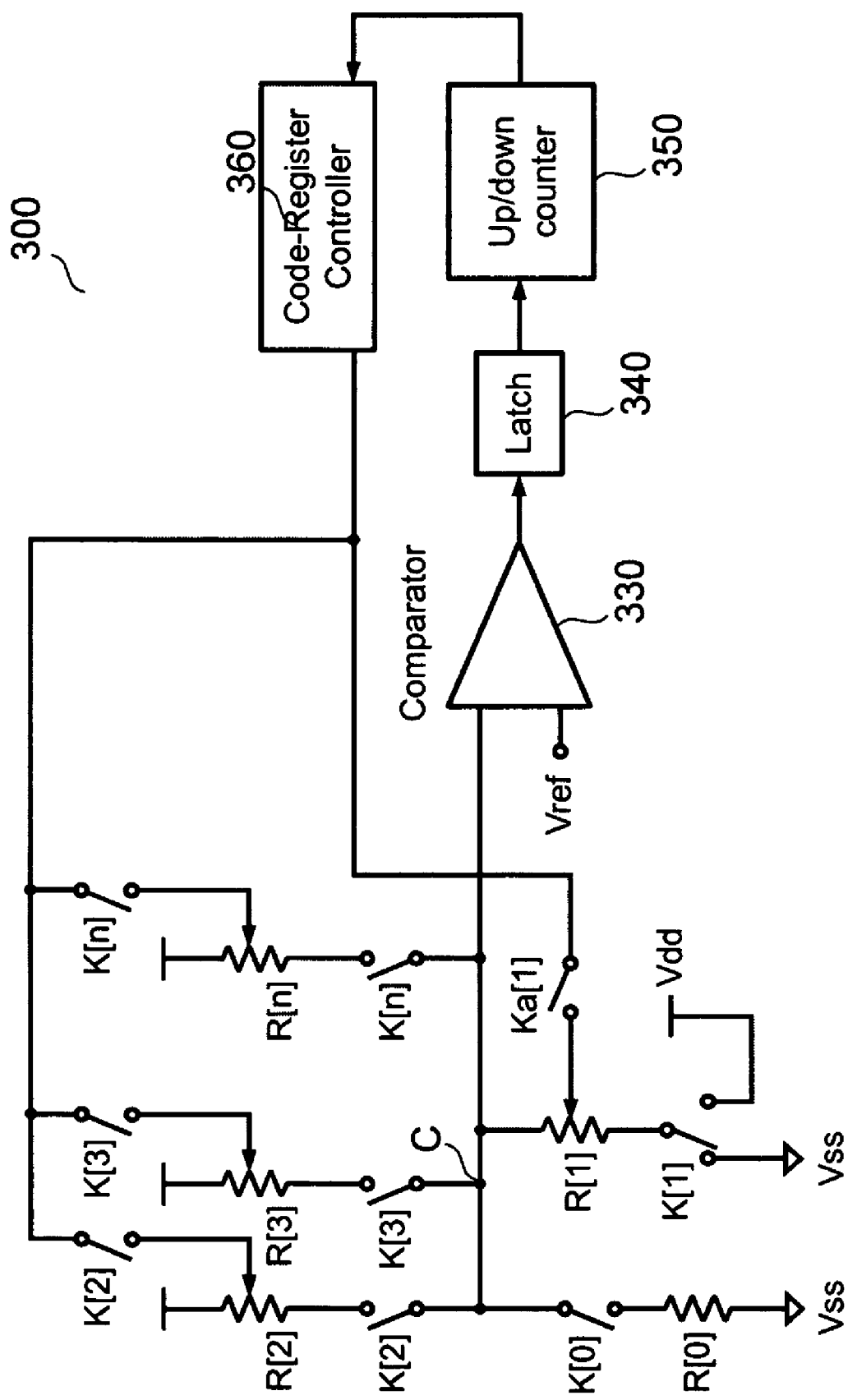
FIG. 3 is a block diagram of a resistor calibration system according to one embodiment the present invention.

FIG. 3 is a block diagram of a resistor calibration system 300 according to one embodiment of the present invention. The calibration system 300 expends the calibration system 100, as shown in FIG. 1, to calibrate multiple DCC resistors R[1:n]. When a switch K[0] is closed, a switch K[1] is switched to Vdd, and all other switches are open, a reference resistor R[0] is used to calibrate a first DCC resistor R[1]. After the first DCC resistor R[1] is calibrated, it is used to calibrate other DCC resistors R[2:n], one by one. During these calibrations, the switch K[0] is open, K[1] is switched to Vss. Switches K[2] and Ka[2] are closed when a DDC resistor R[2] is under calibration, or switches K[3] and Ka[3] are closed when a DDC resistor R[3] is under calibration, or similarly, switches K[n] and Ka[n] are closed when a DDC resistor R[n] is under calibration. The calibration mechanism used by the system 300 is the same as described in the system 100 as shown in FIG. 1. Here a comparator 330, a latch 340 and an up/down counter 350 are also employed. In order to synchronize the open-and-close of the switches, K[0:n], a code-register-controller 360 is used in place of the simple code register 160 as shown in FIG. 1. The code-register-controller has pre-programmed sequence and control logic to automatically implement the aforementioned switching activities, so that all the DCC resistors R[1:n] get calibrated one by one.

Figure 4:
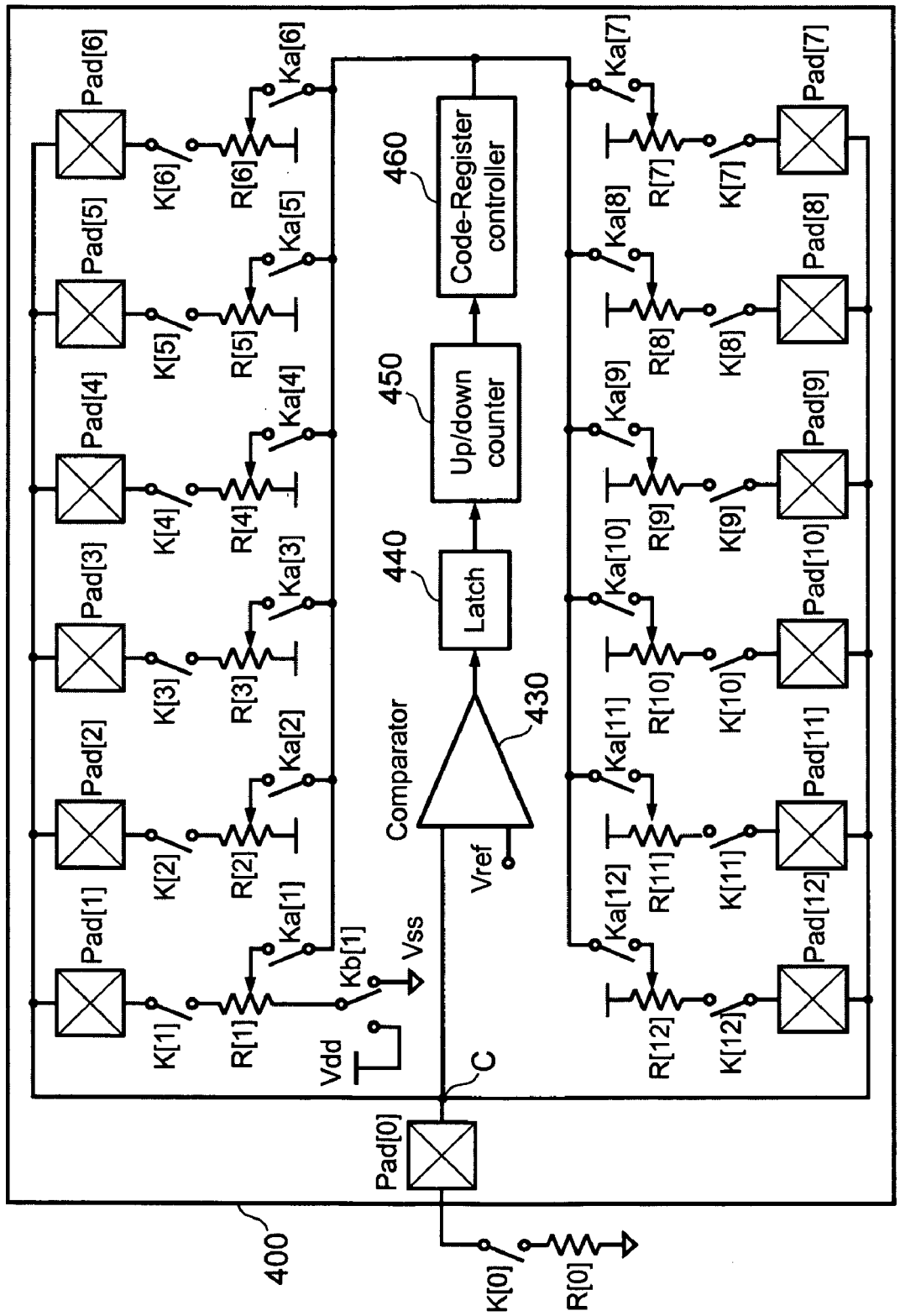
FIG. 4 is a block diagram of a chip with an on-die resistor calibration system.

FIG. 4 is a block diagram of chip 400 with an on-die resistor calibration system, which is adapted from the calibration system 300 as shown in FIG. 3. DDC resistors R[1:12], which are connected to pad[1:12], respectively, are on-die-termination (ODT) resistors. A resistor R[0], connected to a pad[0], is an external reference resistor, used to calibrate the first ODT resistor R[1]. Then the calibrated first ODT resistor R[1] is used to calibrate the rest of the ODT resistors R[2:12] one by one through switching arrangement. For instance, when the R[1] is used to calibrate R[2], switches K[1:2] and Ka[2] are closed, Ka[1] is open, and Kb[1] is switched to Vss. A node C voltage is compared with a reference voltage Vref at a comparator 430. A comparator output is latched by latch 440 and used to control an up/down counter 450. A code-register-controller 460 takes the counter 450 output and uses it to control the DCC resistor R[2]. Changing resistor R[2] value will alter node C voltage, which in turn will further modify resistor R[2] value to reduce the voltage difference between node C and Vref. Such negative feed back loop keeps running until the voltage difference between the node C and Vref falls into a predetermined range, then the loop stops, and the second ODT resistor R[2] is calibrated. Here, the code-register-controller 460 not only registers codes to adjust DCC resistors R[1:12], but also controls all the switches to open and close, so that all the ODT resistors can be calibrated one at a time using a calibrated ODT resistor.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. An on-die calibration system, the system comprises:
   an external reference component with a reference switch;
   an on-die adjustable first component with a first switch;
   an on-die adjustable second component with a second switch; and
   a calibration module coupled to the reference component, the first and second components,
   wherein the calibration module calibrates the first component according to the reference component and calibrates the second component according to the calibrated first component, and
   wherein the calibration module comprises a code-register-controller having a pre-programmed control logic for controlling the reference switch, the first switch, and the second switch one by one to calibrate the on-die adjustable first and second components.

2. The system of claim 1, wherein the calibration module further comprises:
   a comparing module to compare a reference signal with a signal generated by the reference component and the first component, and to compare the signals generated by the first and second components; and
   a counter module coupled to the comparing module to generate codes to adjust the first or second component when they are under calibration.

3. The system of claim 2, wherein the calibration module further comprises a latching module coupled between the comparing and the counter modules.

4. The system of claim 2, wherein the calibration module further comprises a register for storing codes generated by the counter module.

5. The system of claim 1, wherein the first and second components are digital-code-controlled components.

6. The system of claim 5, wherein the digital-code-controlled components comprises a plurality of resistors connected in parallel, and a value represented by the component is adjusted by altering the number of resistors actually connected therein.

7. An on-die calibration system comprising:
   an external reference component with a reference switch;
   a plurality of on-die adjustable resistive components; and
   a calibration module coupled to the reference component and the plurality of the on-die adjustable resistive components,
   wherein the calibration module calibrates a first component with a first switch among the plurality of the on-die adjustable resistive components using the reference component, and calibrates the rest of the plurality of the on-die adjustable resistive components using the calibrated first component, and
   wherein the calibration module comprises a code-register-controller having a pre-programmed control logic for controlling the reference switch the first switch and other switches coupled to the rest of the plurality of the on-die adjustable resistive components one by one to calibrate the first, second and the rest of the plurality of on-die adjustable components.

8. The system of claim 7, wherein the calibration module further comprises:
   a comparing module to compare a reference signal with a signal generated by the reference component and the first component, and to compare the signals generated by the first and the rest of the adjustable resistive components; and
   a counter module coupled to the comparing module for generating codes to adjust the adjustable resistive components when they are under calibration.

9. The system of claim 7, wherein the calibration module further comprises a latching module coupled between the comparing and the counter modules.

10. The system of claim 7, wherein the calibration module further comprises a register for storing codes generated by the counter module.

11. The system of claim 7, wherein the adjustable resistive components are digital-code-controlled components.

12. The system of claim 11, wherein the digital-code-controlled components comprises a plurality of resistors connected in parallel, and the component's value is adjusted by altering the number of resistors are actually connected.

13. A method for calibrating on-die components, the method comprising:
   providing a reference component with a reference switch;
   calibrating a first component with a first switch according to the reference component; and
   calibrating a second component with a second switch using the calibrated first component as a reference, wherein the calibration is performed by a calibration module comprising a code-register-controller having a pre-programmed control logic for controlling the reference switch, the first switch, and the second switch one by one to calibrate the first and second components.

14. The method of claim 13, wherein calibrating the first component further comprises:
   comparing a reference signal with a signal generated by the first component;
   generating a digital code based on a result of the comparing of the reference signal and the signal generated by the first component to adjust a value of the first component; and
   adjusting the first component based on the generated digital code.

15. The method of claim 14, wherein the generating further comprises:
   latching the signal comparison result; and
   triggering a counter to count a predetermined number base on the latched signal comparison result.

16. The method of claim 13, wherein the calibrating the second component further comprises:
   comparing signals generated by the calibrated first component and the second component;
   generating a digital code based on a result of comparing the signals generated by the first and second components; and
   adjusting the second component based on the generated digital code.

17. The method of claim 16, wherein the generating further comprises:
   latching the signal comparison result; and
   triggering a counter to count a predetermined number based on the latched signal comparison result.

* * * * *